United States Patent [19]

Moore et al.

[11] Patent Number: 5,053,478

[45] Date of Patent: Oct. 1, 1991

[54] PRODUCTION AND PROCESSING OF THERMALLY STABLE POLYENAMINONITRILES

[76] Inventors: James A. Moore, 3 Audrey La., R.D. #4, Troy, N.Y. 12180; Douglas Robello, 1291 Foothill Cir., Webster, N.Y. 14580

[21] Appl. No.: 561,701

[22] Filed: Aug. 2, 1990

Related U.S. Application Data

[60] Division of Ser. No. 197,651, May 23, 1988, Pat. No. 4,966,954, which is a continuation-in-part of Ser. No. 21,477, Mar. 4, 1987, abandoned.

[51] Int. Cl.$^5$ .................... C08G 73/02; C08G 73/06
[52] U.S. Cl. .................................. 528/125; 528/128; 528/172; 528/173; 528/175; 528/183; 528/188; 528/208; 528/210; 528/211; 528/229; 528/335; 528/337; 528/346; 528/348; 528/352; 528/353; 528/362; 528/205
[58] Field of Search ............... 528/125, 128, 172, 173, 528/175, 183, 188, 208, 210, 211, 229, 335, 337, 346, 348, 352, 353, 362, 205

[56] References Cited

U.S. PATENT DOCUMENTS

| | | | |
|---|---|---|---|
| 3,669,941 | 6/1972 | Dorfman et al. | 528/362 |
| 3,865,791 | 2/1975 | Brinkmann et al. | 528/48 |
| 4,092,162 | 5/1978 | Wright et al. | 528/362 |
| 4,966,954 | 10/1990 | Moore et al. | 528/353 |

FOREIGN PATENT DOCUMENTS 2103227A 7/1983 United Kingdom .

*Primary Examiner*—Earl Nielsen
*Assistant Examiner*—Frederick Krass
*Attorney, Agent, or Firm*—McGlew & Tuttle

[57] ABSTRACT

Production of polyenaminonitriles including those which can be cyclized to very stable poly(aminoquinolines) without the evolution of any small molecules and thus in a manner free of volatiles. The polyenaminonitriles are polymers which have desirable dielectric properties, and include those which can be cyclized to poly(aminoquinolines) without the evolution of volatiles to make defect-free films and composites of similar dielectric properties because of this characteristic.

25 Claims, 2 Drawing Sheets

FIG. 1

FIG. 2 DSC of Poly (enaminonitrile)

PRODUCTION AND PROCESSING OF THERMALLY STABLE POLYENAMINONITRILES

STATEMENT OF GOVERNMENT INTEREST

The Government has rights to this invention under U.S. Navy, Office of Naval Research Contract No. N00014-85-K-0632.

CROSS REFERENCE TO RELATED APPLICATION

This is a divisional application of application Ser. No. 197,651 filed May 23, 1988 now U.S. Pat. No. 4,966,954, which is a continuation in part of copending U.S. parent application Ser. No. 021,477 filed Mar. 4, 1987 now abandoned.

FIELD AND BACKGROUND OF THE INVENTION

The present invention relates to thermally and hydrolytically stable polyenaminonitriles, including those which can be cyclized and cured by heating. According to a preferred feature, the curing reaction proceeds without the evolution of volatile by-products which simplifies the fabrication of hole-free shaped solid masses such as thin films as well as essentially defect-free composites.

U.S. Pat. No. 4,148,844 to von Bonin et al discloses the production of a heat curable resin by polymerizing a polycarbodiimide and vinyl monomer.

U.S. Pat. No. 4,421,920 to Baudouin et al discloses a method for producing 4-amino-chloroquinolines.

British Patent Publication GB 2,103,227 A (1983) to Papir discloses the production of tractable, i.e. shapeable, polyquinolines in an m-cresol solution of phosphorus pentoxide as acidic catalyst from a precursor monomer, such as 5-acetyl-2-amino-benzophenone, which on heating yields poly 2,6-(4-phenylquinoline), recovered as a coagulated solid by contacting the resulting acidic reaction solution with a basic coagulation bath of an amine dissolved in a protonic solvent such as water or ethanol, e.g. an ethanol/triethylamine mixture.

The coagulated solid of Papir may be made into a tractable film by redissolving the polyquinoline in an m-cresol solution of phosphorus pentoxide with heating and pouring of the solution onto a heated surface, followed by quenching in an ethanol/triethylamine mixture and oven drying, thereby inherently liberating volatile by-products such as water or ethanol and producing pin-hole defects in the solid product. The film may be doped to change its electrical properties.

Clearly, in the Papir system, the m-cresol and phosphorus pentoxide comprise an acidic solvent which functions as a catalyst to effect loss of water as a volatile by-product.

None of these references discloses the production of polyenaminonitrile or the cyclization of this polymer into the corresponding poly(4-amino-quinoline) or other poly(aminoquinoline) through the use of heat or other means. The chemistry used in these references is also different from that used for the present invention.

The following articles are all instructive in understanding the present invention:

[1] Rappoport, Z., *Adv. Phys. Org. Chem.*, 1969, 7, 1
[2] Modena, G., *Acc. Chem. Res.*, 1971, 4, 73
[3] Rappoport, Z., *Acc. Chem. Res.*, 1981, 14, 7
[4] Ueda, M.; Kino, K.; Hirone, T.; Imai, Y., *J. Polym. Sci., Polym. Chem. Ed.*, 1976, 14, 931
[5] Imai, Y.; Ueda, M.; Otaira, K., *J. Polym. Sci., Polym. Chem. Ed.*, 1977, 15, 1457
[6] Ueda, M; Otaira, K.; Imai, Y., *J. Polym. Sci., Polym. Chem. Ed.*, 1978, 16, 2809
[7] Imai, Y.; Sakai, N.; Susaki, J.; Ueda, M., *Makromol. Chem.*, 1979, 80, 1797
[8] Pavlisko, J. A.; Huang, S. J.; Benicewicz, B. C., *J. Polym. Sci., Polym. Chem. Ed.*, 1982, 20, 3079
[9] Moore, J. A.; Kochanowski, J. E., *Macromolecules*, 1975, 8, 121
[10] Moore, J. A.; Mitchell, T. D., *J. Polym. Sci., Polym. Chem. Ed.*, 1980, 18, 3029
[11] Moore, J. A.; Mitchell, T. D., *J. Polym. Sci., Polym. Chem. Ed.*, 1983, 21, 1305
[12] Kimura, S., *Makromol. Chem.*, 1968, 117, 203
[13] Bass, R. G.; Sinsky, M. S.; Connell, J. W.; Hergenrother, P. M., *Polym. Prepr.*, 1984, 25 (2), 59
[14] Conrad, M.; Limpach, L., *Chem. Ber.*, 1887, 20, 944
[15] Conrad, M.; Limpach, L., *Chem. Ber.*, 1888, 21, 525
[16] Brown, R. F., "Pyrolytic Methods in Organic Chemistry", Academic Press, New York, 1980
[17] Libis, B.; Fleury, J. P., *Bull. Soc. Chim. Fr.*, 1965, 3323
[18] Friedrich, K., *Angew. Chem. Intl. Ed.*, 1973, 6, 959

References [1] through [3] diclose the mechanisms of a vinylic nucleophilic substitution. This reaction has been inaccurately referred to as a vinylogous nucleophilic substitution in articles [4] through [8], where other polymers have been produced in the same way.

β-halo-dicyanovinyl compounds react with aromatic amines, in most cases by a two step addition-elimination mechanism to produce enaminodinitriles in high yield. See article [3]. β-halo-monocyanovinyl compounds should also be effective.

Other researchers have produced poly(enamines) by condensation of bis-(β-keto esters) with diamines (see articles [9] through [12]) and by Michael addition of aromatic diamines to diacetylenic diketones (see article [13]).

Early work by a group including one of the co-inventors of the present application (articles [9] through [11]) and others (article [12]), demonstrated that poly(enaminoesters), prepared with aromatic diamines, could be cyclized to thermally stable polyquinolones via the Conrad-Limpach reaction, as disclosed in articles [14] to [15] and represented by equation (1) as follows:

wherein ROH is any relatively volatile aliphatic or aromatic alcohol (phenol).

SUMMARY OF THE INVENTION

An object of the present invention is to extend the earlier work identified above to polyenaminonitriles, especially those which could be cyclized to poly(aminoquinolines) in a process similar to the Conrad-Limpach reaction.

It is noted that the cyclization process as contemplated by the present invention is similar to the Conrad-Limpach reaction but this similarity is superficial and not mechanistically based. The basic chemical change in the instant cyclization is more analogous to the Hoesch reaction, yet the latter is an acid-catalyzed cyclization of nitriles on aromatic rings.

It is further noted that there is almost no precedent for the thermal cyclization reaction of the present invention. One obscure reference in a Bulgarian journal, i.e. [19] S. Robev, *Dokl. Bolg. Akad. Nauk*, 1978, 31, 865; *Chem. Abstr.*, 1979, 90, 186898k, cites a thermal cyclization but under the conditions described in a translated abstract, the reaction apparently does not occur.

The present invention represents the first example of polyenaminonitriles as well as the first use of such materials to generate poly(aminoquinolines) in the manner disclosed herein.

Another object of the present invention is to produce a thermally and hydrolytically stable polymer for electronic and composite application, among others, involving synthesis and curing reactions of polyenaminonitriles.

These enaminonitrile polymers have been produced according to the present invention by the vinylic nucleophilic substitution reaction disclosed in articles [1] through [8] above. This is an attractive method because of its relatively rapid reaction rate and the lack of interfering side reactions.

According to the present invention, analogous difunctional compounds have been synthesized and reacted with aromatic diamines to form polyenaminonitriles.

A further object of the invention is to provide thermally stable polyenaminonitriles which cure without the evolution of volatiles, thereby simplifying the fabrication of films which are free of pin holes and composites which are free of defects, which could otherwise be caused by escaping volatile fragments.

The polyenaminonitriles of this invention are completely soluble in solvents like N,N-dimethyl formamide. This also permits easy fabrication of the polymer. These polyenaminonitriles can be boiled in water without degradation, and thus do not hydrolyze, in contrast to polyamic acids which hydrolyze when heated in water. Upon heating, the new polymer, i.e. polyenaminonitrile, according to the cyclization feature of this invention, undergoes in part, a chemical reaction leading to poly(aminoquinoline) structures, which contribute to the insolubility and thermal stability thereof, such as films, without forming gaseous (volatile) byproducts.

Uses of the various polymers of the present invention include the formation of insulating layers or dielectric layers in microlithography, in place of polyimides. Composite matrices can also be formed with such polymers of the present invention in place of polyimides or epoxies. The instant polymers can also be used to form membranes for separation processes in corrosive environments at elevated temperatures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The formation of polyenaminonitriles III and cyclization in the typical case to poly(aminoquinolines) IV, is illustrated by equation (2) as follows:

-continued

IV

IVu wherein Y is any leaving group, X is hydrogen or any electron-withdrawing group, A and B preferably are each individually a mononuclear or polynuclear unsaturated ring system, a is 0 or 1, and n is at least 2, e.g. 2 to 40,000.

However, in general, in the polyenaminonitriles broadly contemplated herein, the polymer has a backbone comprising recurring repeat units IIIu of the formula IIIu wherein X, A and a are the same as defined above, while B may be any appropriate substituted or unsubstituted difunctional radical such as a mononuclear or polynuclear unsaturated ring system, an aliphatic group, a mononuclear or polynuclear cycloaliphatic group, or a mononuclear or polynuclear aliphatic-cycloaliphatic group.

These polyenaminonitriles desirably have a dielectric constant of at least about 5, and especially about 5–10, or higher, although a dielectric constant below about 5 may also be provided.

On the other hand, in the case of the cyclizable polyenaminonitriles, the same will have a backbone comprising recurring units containing an enaminonitrile group linked via its enamino group to a nuclear atom of an unsaturated 6-membered ring structure-containing system or moiety having a hydrogen atom at an ortho position to said nuclear atom, whereby to provide a site enabling cyclization to take place by a molecular rearrangement exothermic reaction to produce the corresponding poly(aminoquinoline) IV, the 6-membered ring structure conveniently being phenyl.

Thus, in the cyclizable polyenaminonitriles, B will be a substituted or unsubstituted mononuclear or polynuclear unsaturated ring system, which may be the same as or different from the substituted or unsubstituted mononuclear or polynuclear unsaturated ring system comprising A, but in particular will be such that each enaminonitrile group linked to B in the recurring units IIIu will be linked via its enamino group to a nuclear atom of a corresponding 6-membered ring structure comprised by B, e.g. phenyl, and having a hydrogen atom at an ortho position to said nuclear atom, whereby in the corresponding cyclized polymer the resulting poly(aminoquinoline) IV will have a backbone comprising recurring repeat units IVu of the formula:

wherein B is as defined immediately above and X, A and a are the same as previously defined.

It will be appreciated that the formula of IV is intended herein to comprehend as well the end group cyclized form poly(aminoquinoline) of the structure

IV'

These poly(aminoquinolines) desirably have a dielectric constant of at least about 5, although a dielectric constant above or below about 5 may also be provided.

The foregoing A and B substituted or unsubstituted mononuclear or polynuclear unsaturated ring systems or moieties generally comprise aromatic or heterocyclic ring structures of 5 or 6 or more nuclear atoms, e.g. with one or more N, O or S nuclear hetero atoms, including fused polynuclear ring structures, of the difunctional type per the above formulas for I, II, III and IV, as the case may be.

Overall, including non-cyclizable polyenaminonitriles:

Y may be any leaving group including, but not limited to, —F, —Cl, —Br, —I, —C≡N, and —O—R (where R=alkyl, cycloalkyl or aryl, such as alkyl of 1–20, especially lower alkyl, e.g. of 1–6, and cycloalkyl of 5–6, carbon atoms, phenyl and naphthyl);

X may be H or any electron-withdrawing group including, but not limited to, —C≡N,

(where R is the same as defined above);

A may be for instance

-continued

, or or, in general, any aromatic or polynuclear aromatic residue, as well as ortho, meta and para isomers thereof, where Z is any bifunctional linking group including, but not limited to, —O—, —S—, —NH—, —NR— (where R is the same as defined above), and $R'_m$ = substituent groups including, but not limited to, $CH_3$—, $CH_3$—$CH_2$—, Br—, I—, F—, —O—$CH_3$, —S—$CH_3$,

C≡N, —$NO_2$, and

;

wherein the number "m" may be from zero to that required to replace all hydrogen atoms with the substituent group in question, as above indicated; and

B may be any group as defined in A, as well as aliphatic and/or cycloaliphatic groups including but not limited to, $+CH_2+_p$, where p is e.g. 1–10 or 1–20, i.e. methylene or polymethylene,

, or

In particular, Y is halogen, cyano, alkoxy, cycloalkoxy, or aryloxy, X is hydrogen, cyano, alkanoyl, alkoxy carbonyl, or alkoxy sulfonyl, A and B are each individually

,

,

, where Z is any bifunctional linking group, R' is alkyl, halogen, alkoxy, alkylthio, alkylsulfonyl, cyano, nitro, or phenyl, and "m" is a number from 0 to that number required to replace all the available hydrogen atoms with the corresponding R' substituent, and n is an integer of at least 2, or at least 5, or at least 10, and at most 40,000, or at most 20,000, or at most 10,000, such as about 2 to 40,000, preferably about 2 to 20,000, more preferably about 2 to 10,000, especially 5 to 20,000, more especially about 5 to 10,000, and in particular about 10 to 10,000, with each individual such alkanoyl, alkoxy and alkyl moiety in said Y, X and Z groups having preferably 1–20, especially 1–6, carbon atoms, each individual such cycloalkoxy group therein having preferably 5–6 carbon atoms, and each individual such aryloxy group therein having preferably 6–10 carbon atoms, e.g. phenyl and naphthyl, as the case may be.

In the above formulas, I may be e.g. $\beta,\beta'$-dichloro-terephthaloyl dimalononitrile (i.e. a $\beta$-halo-dicyanovinyl compound), or $\beta,\beta'$-dichloro-terephthaloyl diacrylonitrile (i.e. a $\beta$-halo-monocyanovinyl compound, in which case X is other than cyano), II may be e.g. a said unsaturated ring system- or moiety-containing diamine, such as an aromatic diamine, or an aliphatic or cycloaliphatic diamine, while III is polyenaminonitrile (an enamine being defined as a chemical structure having an amino group attached directly to a vinyl moiety, i.e. an ethylenic carbon atom), III being cyclizable where II is a said ring system- or moiety-containing diamine, and IV is poly(aminoquinoline) and includes the corresponding isomers thereof.

In all cases, the difunctional B-containing organic amine compound II, which preferably is a nucleophile, reacts with the vinyl cyanide compound I since the latter has a leaving group Y in $\beta$-position to the cyanide group relative to the vinyl or ethylenic moiety, whereby polymerization takes place to provide the desired enaminonitrile polymer III, with the formation of HY traceable to that leaving group Y and an H atom of the adjacent functional moiety on the B structure.

Advantageously, the insolubilizing or curing of the polyenaminonitrile, and in particular the cyclization of the pertinent polyenaminonitrile to form the corresponding poly(aminoquinoline), is effected desirably by mere heating, and in turn continued heating serves to cure such product to the desired final product, especially in crosslinked form, e.g. involving amino and cyano or other appropriate crosslinkable substituents on the backbones of adjacent polymer molecules which especially provide intermolecular crosslinks by molecular rearrangement without splitting off small molecules or other volatile products.

These crosslinkable curing sites include the terminal cyano groups and any crosslinkable terminal X groups, as well as the recurring unit amino substituents and any crosslinkable X groups on the cyclized poly(aminoquinolines) IV, and any other crosslinkable groups that may be present on the A and/or B moieties thereof. In the uncyclized polyenaminonitriles III, these crosslinkable curing sites include all such cyano groups and crosslinkable X groups and any other crosslinkable groups that may be present on the A and/or B moieties thereof.

It will be appreciated that while A is an optional difunctional linking moiety, being absent from the polymer backbone when a is zero in formulas III and IV as noted above, B is an essential difunctional linking moiety for providing a desired recurring unit in the backbone of the corresponding polymer molecule of the polyenaminonitriles III or of the poly(aminoquinolines) IV, as the case may be, which imparts fundamental properties thereto, especially dielectric properties, in conjunction with the —C[=C(X)(CN)]— group linked directly to its adjacent —NH— group, thereby forming an enamino group —C[=C(X)(CN)]—NH—.

Thus, the thermally stable polyenaminonitriles III have a backbone comprising recurring enaminonitrile units which include a carbon-carbon double bond moiety in which a nitrogen atom bearing a hydrogen atom is directly attached to one carbon of the carbon-carbon double bond moiety and at least one nitrile group is directly attached to the other carbon atom of the carbon-carbon double bond moiety, and further in which only one carbon atom of the carbon-carbon double bond moiety is contained within the polymer backbone.

A major advantage of the cyclization reaction is that cyclization of the cyclizable polyenaminonitriles III to the corresponding poly(aminoquinolines) IV occurs by rearrangement, without the release of any small molecules or other source of gaseous or volatile by-products or fragments. Thus, the formation of pin holes and bubbles during curing is eliminated. The number of possible failure points in the material is also reduced. Since no small molecules are evolved during the cyclization process, the appropriate polyenaminonitriles of the present invention can be cured without the evolution of volatiles by-products.

Thus, in the pertinent cyclization and curing, no fragments are lost from the molecule and no hydrolysis reactions are necessary, since only molecular rearrangement occurs, in which only one cyano group per moiety is involved in the generation of the aminoquinoline unit and such that it is converted to an amino substituent by a hydrogen transfer mechanism, and this may be achieved without the need for any solvent or acid catalyst.

Hence, in formula I, the adjacent X substituent need not also be cyano, but may conveniently be hydrogen or any electron-withdrawing group, as aforesaid, although where X is cyano or other appropriate crosslinkable group, its presence will contribute to desired crosslinking of the cured product.

In contrast to polymers such as polyaramides in which the instant vinyl cyanide group, e.g. —C[=C(CN)$_2$]—, is replaced by a keto group, i.e. —C(=O)—, the instant polyenaminonitriles are generally soluble in solvents such as N-methyl pyrrolidone (NMP), N,N-dimethyl formamide (DMF), N,N-dimethyl acetamide (DMAC) and dimethylsulfoxide (DMSO), and in typical cases in tetrahydrofuran (THF) and 1,2-dimethoxyethane (DME), and can be cast to tough, yellow, transparent films.

In typical polyenaminonitriles herein, because of the electron donating character of the —NH— group and the electron withdrawing nature of the —C[=C(CN)$_2$]— group of the recurring —C[=C(CN)$_2$]—NH— unit, the double bond is highly polarized, and results in a material possessing an unexpectedly high dielectric constant, e.g. of about 8.0 for the polyenaminonitriles before heat treatment, and of about 5.0 for the resulting poly(aminoquinolines) after heat treatment, whereas typical organic polyamides have values in the range of only 2.6 to 3.

A further advantage of the instant polyenaminonitriles is that they can be isolated, purified and fabricated by normal technique such as dissolution and casting of films. Another property of the cyclizable enaminonitrile polymers is that when the cast film (or other solid structure) is heated above about 350° C. the property of being soluble is lost, due to curing, but the resulting poly(aminoquinoline) material remains a film, although somewhat more brittle than before being heated.

It will be noted that if a dilute solution of the cyclizable polyenaminonitrile in a high boiling solvent such as diphenyl sulfone is refluxed at 350° C., the polymer is converted to the corresponding poly(aminoquinoline), but remains soluble. It can be concluded that, in the dilute solution, the cyclized polymers are isolated from one another, and thus achieve rearrangement without crosslinking or curing, but in concentrated form in a solid mass, e.g. in the absence of any solvent, the chains are close enough to one another for reactions to occur between the cyano groups on one chain (e.g. R$_1$—C≡N) and amino groups on another chain (e.g. R$_2$—NH$_2$), whereby to achieve crosslinks (e.g. R$_1$—C(=NH)—NH—R$_2$).

Thus, a distinct advantage of the present invention, in the case of the cyclizable polyenaminonitriles, is that they may be provided in solid mass form, in the absence of any catalyst, solvent or other source of volatiles, and simply heated to curve and crosslink the polymer molecules to poly(aminoquinolines) of like solid mass form, without any pin hole or other defects or imperfections, enabling the product to be used in hole free thin film or composite product form.

A specific example of equation (2) is shown in equation (3):

(3)

(4)

Equation (4) is one example of the formation of a non-polymeric enaminonitrile, i.e. [(4-methoxy-phenylamino)-phenyl-methylene]propanedinitrile VII, from the corresponding (chloro-phenyl-methylene)-propanedinitrile V and 4-methoxy-phenylamine VI, which is easy to handle and can be more completely characterized than an insoluble polymer, thus serving as an appropriate model for the instant polyenaminonitrile concept.

Cyclization of the model enaminonitriles by flash vacuum thermolysis (see article [16] above) led to modest yields of 4-aminoquinolines, per equation (5):

(5)

A typical non-polymer model reaction for the present invention was carried out as follows:

β-Chloro-benzylidine-malononitrile (V) was stirred with two equivalents of p-anisidine in dry methylene chloride for four hours at room temperature under nitrogen, per equation (4):

Equation (5) is a corresponding example of the cyclization process of a well defined small molecule, 3-phenyl-3-(phenylamino)-2-propenenitrile, which gives a product, 4-amino-2-phenyl-quinoline (30% yield), which can be easily purified and characterized. It will be understood that the high temperature of 650° C. used is only for convenience, because the small molecule is volatile.

The cyclization chemistry involved in these model illustrations is not intrinsic to the polymer but to the enaminonitriles as herein described.

However, advantageously this chemistry is utilized according to the present invention to provide a novel method for monomer processing to polyenaminonitriles, which are novel products of desirable properties, and in turn a novel method for processing such polyenaminonitriles to cured form, and especially to poly(aminoquinolines) in the case of those polyenaminonitriles which have a backbone comprising recurring units containing an enaminonitrile group, i.e. having the structure —C[=C(X)(CN)]—NH—, linked via its enamino group to a nuclear atom of a corresponding unsaturated 6-membered ring structure-containing moiety comprised by B in the formula of III and having a hydrogen atom at an ortho position to said nuclear atom, thereby rendering the polyenaminonitriles cyclizable.

For kinetic measurements, the rate of reaction between β-chloro-benzylidine-malononitrile (V) and excess aniline was determined at 30° C. in acetonitrile solution by measuring the optical density of the mixture at 360 nm, a wavelength where the product absorbs strongly and the starting materials have negligible absorption. The model reaction was found to obey the rate expression:

$$-d[V]/dt = 2.40 \times 10^{-4}[V][\text{aniline}] + 0.43 \times 10^{-4}[V][\text{aniline}]^2 \quad (6)$$

For monomer syntheses, the required difunctional β-chloro-dicyanovinyl monomers were synthesized by modification of known chemistry of monofunctional compounds (see articles [17] and [18]), per equation (7). Aromatic diacid chlorides were reacted with malononitrile under phase transfer catalyzed (PTC) basic conditions. For example, to a vigorously stirred solution of malononitrile and terephthaloyl dichloride in methylene chloride at 0° C. was added dropwise a solution of 0.1 equivalent of benzyl triethylammonium chloride in excess 6N NaOH. The precipitated bis-enol disodium salt (XIV) was collected by filtration, washed with isopropanol, and recrystallized from methanol/water to give a 65% yield of product. When this salt was refluxed for thirty minutes with excess phosphorus oxychloride, β,β′-dichloro terephthaloyl dimalononitrile as monomer I' was obtained in 70% yield, per equation (7):

(7)

I'

For polymerization, equimolar amounts of the bis-(β-chloro-dicyanovinyl) monomer as the monomer I and an aromatic diamine as the organic diamine II were dissolved in dry N-methyl pyrrolidone (NMP), and heated under nitrogen for 12 to 16 hours at 70° C., using 4-(dimethylamino)-pyridine as an acid acceptor. The reaction mixture was poured into water to precipitate the polymer, i.e. polyenaminonitrile III. The polymer was redissolved in N,N-dimethyl formamide (DMF), and then reprecipitated into methanol. The isolated polymer was dried at 100° C. in vacuo for 24 hours. Intrinsic viscosities (measured in DMF at 25° C.) as high as 0.8 dL/g were found for these polymers. The range was 0.39 to 0.84 dL/g.

It will be realized from equation (2) that in the 1:1 mole ratio reaction of the monomer I and organic diamine II to form the corresponding polyenaminonitrile III, an acid acceptor such as an acid binding agent or inorganic or organic base, e.g. sodium hydroxide or 4-(dimethylamino)-pyridine, is desirably used where Y is a group such as halogen or cyano, since the split off HY secondary product is acid or acidic in nature, e.g. halogen acid (hydrogen halide) or hydrocyanic acid (hydrogen cyanide), and is thereby conveniently removed from the system. On the other hand, where Y is a group such as alkoxy, cycloalkoxy or aryloxy, the split off product HY is a volatile alcohol conveniently removed from the system by simple evaporation.

In general, depending on the solubility of the secondary product HY in the solvent used as reaction medium, the process for producing the polyenaminonitriles permits advantage to be taken in the appropriate case of the elevated temperatures attained during the heating of the reaction mixture to volatilize that secondary product, whether acidic or alcoholic in nature, i.e. without the need for any acid acceptor in the reaction mixture, since these secondary products are usually gaseous or volatile and thus readily released from the reaction mixture.

Figure 1:
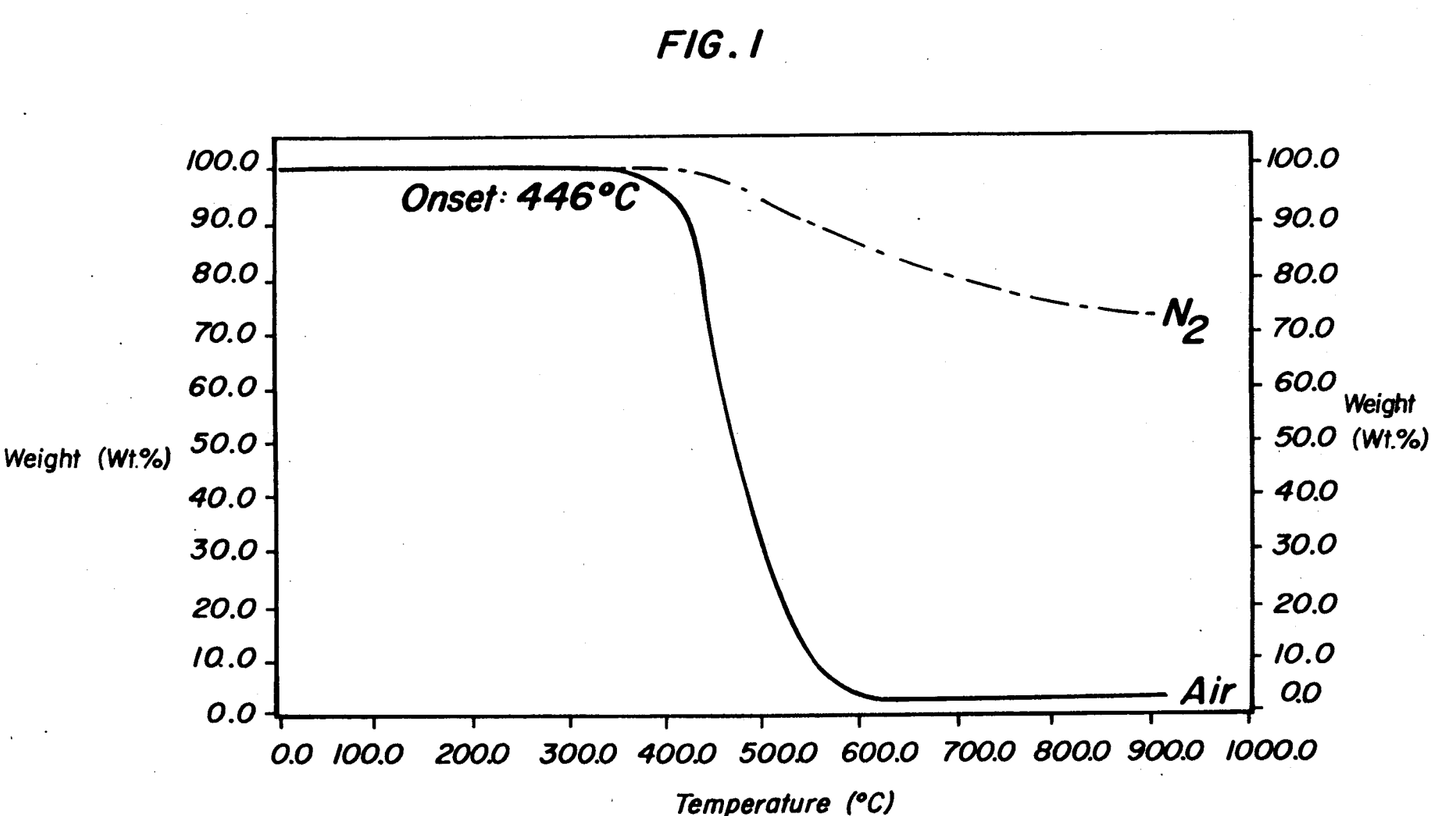
FIG. 1 is a thermogravimetric analysis (TGA) graph (weight loss in percent as a function of increasing temperature) of polyenaminonitrile, indicating its cyclization and curing (at about 350° C.) to poly(aminoquinoline) according to a preferred feature of the present invention, and demonstrating the stability of the cyclized and cured product against thermal decomposition in nitrogen and in air until vigorous temperatures of at least about 450° C. are reached (well above the 350° C. cyclization temperature)
Figure 2:
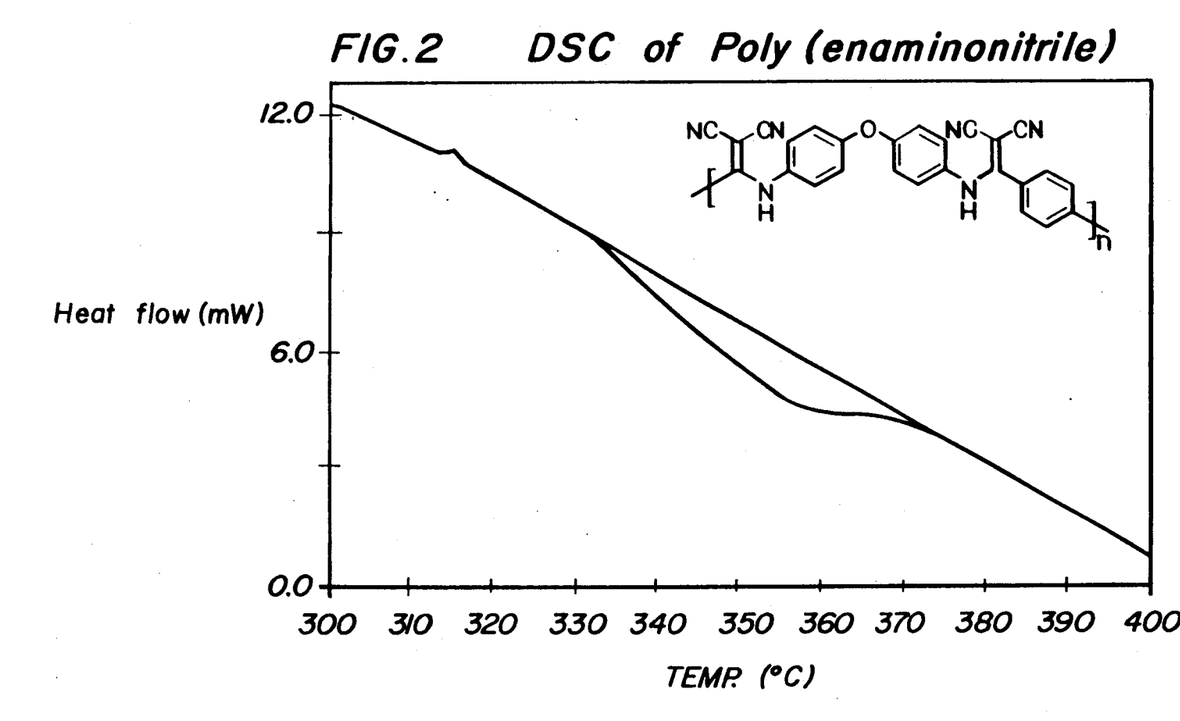
FIG. 2 is a differential scanning calorimetry (DSC) graph (heat flow in milliwatts (mW) as a function of increasing temperature) of the polyenaminonitrile according to a preferred feature of the present invention, showing in nitrogen a first scan depression (exotherm or heat loss) at about 350° C. and a second scan uniform slope indicating meanwhile cyclization per the first scan to poly(aminoquinoline).

For thermal analysis, differential scanning calorimetry (DSC) under nitrogen flow, illustrated in FIG. 2, and thermogravimetric analysis (TGA), under nitrogen flow and also under air flow, illustrated in FIG. 1, were performed using a heating rate of 10° C./min. on a Perkin Elmer model 7 system.

The efficiency of the vinylic nucleophilic substitution for producing poly(enamines) was tested by the preparation of appropriate model compounds. Excellent yields of the corresponding enaminonitriles were obtained.

The polyenaminonitriles of the present invention displayed good thermal stability by TGA, the cyclizable polyenaminonitriles undergoing exothermic rearrangement to poly(aminoquinolines) which do not lose mass until about 450° C. (FIG. 1). This loss of mass is due to thermal decomposition at such high temperature, not the evolution of volatiles. Glass transitions and melting points were not found below 400° C. (DSC); however, a shallow exothermic transition near 350° C. was detected (FIG. 2), which disappeared when the same sample was cooled and rescanned. This transition is caused by the exothermic rearrangement to a poly(aminoquinoline), as shown by DSC of model compounds. Optical microscopy revealed a glass transition for polyenaminonitrile at around 200° C.

Isothermal aging studies of polyenaminonitrile done in nitrogen for 12 hours at 400° C. and 500° C. showed very slow mass loss after an initial small evolution of lighter molecules from the sample, i.e. due to initial escape of oligomers (dimers and trimers), prior to cyclization of the sample to poly(aminoquinoline), and after which the slow mass loss was due to thermal decomposition of the resulting cured cyclized product under the vigorous conditions of such sustained high temperatures during the aging period, and was not due to emission of any volatiles.

Cyclizable enaminonitrile polymer samples which were subjected to an initial heat treatment for thirty minutes at 400° C. were insoluble in all solvents attempted, because they had changed from polyenaminonitriles to poly(aminoquinolines). The structural assignments were based upon IR spectra and comparison with model compounds.

The cured aminoquinoline polymers which resulted upon such heat treatment at 400° C., whereby to achieve crosslinking, e.g. of attendant amino and cyano or other crosslinkable substituents on the polymer backbone, showed outstanding thermal resistance, retaining 100% of their mass up to 400° C. under nitrogen, and with initial mass loss near 500° C. and retention of 70% of their mass at 900° C. (cf. FIG. 1). It is noted that one example of the polyenaminonitrile of the present invention has been cyclized by heating in dilute solution to a poly(aminoquinoline) which remains soluble. Upon further heating, this soluble material becomes insoluble because of crosslinking.

Polyenaminonitriles of moderately high molecular weight can be conveniently synthesized by vinylic nucleophilic substitution of the corresponding bis-($\beta$-chloro-dicyanovinyl) compounds. These enaminonitrile polymers, where cyclizable as above described, can be thermally cyclized, e.g. at about 350° C. or above to very stable poly(aminoquinolines) without evolution of volatiles, according to this invention.

In comparison to the early work involving the present invention which is identified above and which involves the Conrad-Limpach cyclization illustrated in equation (1), according to a preferred feature herein the cyclizable polyenaminonitriles can be induced to cure by an intramolecular rearrangement at high temperature to produce in particular poly(4-aminoquinolines) illustrated in equation (8).

A comparison between equations (1) and (8) shows their similarity:

Whereas the cyclized polymer of equation (3) includes two individual quinoline ring structures in the overall polynuclear unsaturated ring moiety, that of equation (8) includes a fused heterocyclic composite quinoline ring structure in the overall polynuclear unsaturated ring moiety, in which the central benzene ring nucleus serves as a common nuclear moiety for each lateral amino substituent containing pyridine ring nucleus, thereby constituting a quinoline structure with respect to either or both lateral pyridine ring structures, and thus providing a poly(aminoquinoline) having a recurring aminoquinoline containing unit.

Therefore, as contemplated herein, it will be understood that poly(aminoquinoline) is intended to define any aminoquinoline containing recurring unit in the polymer, including that of the type shown in equation (3) as well as that of the type shown in equation (8).

Not only can the instant polyenaminonitrile be cyclized and cured in the appropriate case, by heating, when in the form of a shaped solid, void-free, continuous material integral or monolithic mass, such as a cast thin film, essentially free from volatiles and by a reaction effected in the absence of any solvent or catalyst and without the evolution of any volatiles, so as to produce the corresponding poly(aminoquinoline) in situ in the form of a corresponding shaped mass which is essentially free from volatiles-generated bubble and pin hole imperfections, but the same void-free result will also occur where the polyenaminonitrile is in the form of a shaped solid composite material particle mass, e.g. of precipitated powder.

In the latter case, the mass in any appropriate three dimensional shape in a compacting mold is subjected to compacting mechanical consolidating pressure, e.g. of several atmospheres to several hundred atmospheres, such as about 14–14,000 psig (about 1–100 atm. gauge), for about 10 minutes to 3 hours, during the heating to effect cyclizing and curing, such pressure being sufficient to coalesce the particles into a void-free, continuous material integral or monolithic mass during the reaction, whereby to form in situ a cured poly(aminoquinoline) composite article, as a continuous material integral or monolithic mass film or other structure, similarly essentially free from volatiles-generated bubble and pin hole imperfections.

Regarding equation (2), the polyenaminonitriles III will form upon reacting generally equivalent quantities of the monomer I with the diamine II, optionally in the presence of a solvent such as a polar, aprotic solvent, e.g. NMP or DMF, at any temperature from about room temperature to just below about 350° C., e.g. from about room temperature up to about 300° C. or up to about 325° C., such as about 70° C. to about 325° C., preferably about 70° C. to about 300° C., and especially about 160° C. to about 325° C., and more especially about 160° C. to about 300° C., using one equivalent of an acid acceptor where appropriate, such as a trialkyl amine, e.g. triethylamine, or other organic base such as dimethylamino pyridine, or an inorganic base such as sodium hydroxide, etc., thereby producing cyclizable or non-cyclizable polyenaminonitrile, depending on whether the diamine II is a said unsaturated ring moiety containing diamine or not, as noted hereinabove.

The uncured polyenaminonitriles are conveniently recovered from the reaction mixture by precipitation upon contacting the mixture with water, and are generally soluble in the usual organic solvents such as NMP, DMF, DMAC and DMSO, and are thermally and hydrolytically stable.

On the other hand, the cyclization and curing of the cyclizable polyenaminonitriles to the poly(aminoquinolines) IV per equation (2) will only take place where said diamine II is a said unsaturated ring moiety containing diamine. Such is carried out in the specific absence of any solvent or catalyst to achieve the desired pin hole and like defect free solid cured product, using a minimum temperature of about 350° C., such as about 350° C. to about 400° C.

Thus, the polymerization to form the polyenaminonitrile is normally carried out at a temperature below the temperature at which the corresponding cyclizable polyenaminonitrile will cyclize to the corresponding poly(aminoquinoline) and in turn cure. Whereas the uncured poly(aminoquinolines) are also generally soluble in the same said usual solvents, upon curing, the crosslinked poly(aminoquinolines) are generally insoluble in such organic solvents.

Since the cyclization involves a molecular rearrangement reaction which is mildly exothermic, higher heating temperatures than about 350° C. to about 400° C. are unnecessary to achieve such cyclization, and ensuing crosslinking during curing will occur following this procedure. For instance, a thin film form of the polyenaminonitrile may be simply heated in an oven to achieve conversion to the poly(aminoquinoline) and curing to the final product. The heating is sufficient for the polymer molecules in the solid mass to become mobile for undergoing the desired molecular rearrangement and crosslinking.

As to the curing of the non-cyclizable polyenaminonitriles, i.e. where said diamine II is an aliphatic and/or cycloaliphatic moiety containing diamine, this may be carried out by heating the polyenaminonitrile in a suitable organic solvent, or in shaped solid mass form, to achieve corresponding crosslinking of the stated type crosslinkable groups, in the same way as in the case of the cyclizable polyenaminonitriles, e.g. using a curing temperature of about 350° C. to about 400° C.

In this case, also, higher heating temperatures are unnecessary, and ensuing crosslinking during curing will occur following this procedure. In particular, as to the shaped solid mass form of the polymer, e.g. a thin film, the same may be simply heated in an oven to achieve curing to the final non-cyclized polyenaminonitrile product, which results in a like void-free structure if no solvent or catalyst is present in the uncured starting shaped solid mass. The heating is sufficient for the polymer molecules in the solid mass to become mobile for undergoing the desired molecular rearrangement for crosslinking.

Overall, according to the invention, the polyenaminonitriles can be fabricated to useful articles in solventless processes as well as by solution techniques such as spin casting and quiescent evaporative film generation. If such polymeric material is heated above the temperature at which the constituent chains become locally mobile, i.e. the glass transition temperature, but below the temperature at which the chains become generally mobile over the broad extent of the sample, i.e. the melting temperature, it can be changed into useful forms by the application of pressure during the heating, as aforesaid.

In the particular case of polyenaminonitriles, the chemistry peculiar thereto provides additional advantages for this mode of fabrication. This approach can be applied to fabrication of bulk materials as well as composite materials. For example, by simply compacting a finely powdered sample of a typical polyenaminonitrile into a mold and gradually applying pressure, e.g. 1–100 atm. gauge, thereto while raising the temperature such as from room temperature, e.g. 23° C., to about 400° C., a densely packed, void-free piece or shaped article can be produced.

Because of the nature of the pertinent polyenaminonitriles herein, as the glass transition temperature is approached and the sample softens, the applied pressure, especially in the optional presence of a vacuum, if desired, will urge the powder together, thereby forcing out gases and eliminating voids. As the temperature continues to rise and passes through the range at which the cyclization to poly(aminoquinoline) occurs, the sample is further compacted because chain flexibility is decreased by the cyclization, and as the heating continues, crosslinking between chains occurs by reaction of crosslinkable groups, as aforesaid, such as cyano groups and amino groups generated in the cyclization reaction.

Indeed, both cyclization and crosslinking reactions occur without the evolution of volatile by-products. This advantage means that no voids will be generated and that further compaction can occur to generate a monolithic, void-free sample or cured product, completely different from those obtained in the past.

In greater detail, the synthesis of the monomer in equation (7) is as follows:

Two moles of malononitrile are condensed with terephthaloyl chloride under base-catalyzed, phase-transfer conditions. The resulting disodium bis-enolate XIV was reacted with phosphorus oxychloride in dry methylene chloride to form the desired monomer I.

The following further examples are set forth by way of illustration and not limitation of the present invention.

Production and polymerization of di(enaminonitrile) monomer and organic diamine to form polyenaminonitrile is exemplified as follows:

EXAMPLE 1

(a) Preparation of
1,3-Bis(2,2-dicyano-1-hydroxy-vinyl)benzene, disodium salt (1a)

A two-phase mixture consisting of 123.3 g (0.607 mol) of isophthaloyl chloride, and 80.2 g (1.21 mol) of malononitrile in 450 mL of dichloromethane, with 27.6 g (0.121 mol, 0.10 eq) benzyltriethylammonium chloride in 100 mL of water, was stirred and cooled in an ice bath. Five hundred mL of 6N NaOH solution was added dropwise to the vigorously stirred reaction mixture over 3 hours. The mixture was slowly warmed to room temperature, and stirring was continued for 18 hours. The heterogeneous mixture was then filtered, and the precipitate was washed with isopropanol and dried in air. The precipitate was recrystallized from water, producing 62.4 g (33%) of the salt (1a) [bisenolate], i.e. 1,3-bis(2,2-dicyano-1-hydroxy-vinyl)benzene, disodium salt, as a tan powder.

IR (KBr): 3400 br (possible hydrate), 2200 cm$^{-1}$ (C≡N).

(b) Preparation of
1,3-Bis(chloro-2,2-dicyano-vinyl)benzene (1b)

The bisenolate (1a) (10.0 g, 32.7 mmol), i.e. 1,3-bis(2,2-dicyano-1-hydroxy-vinyl)benzene, disodium salt, was mixed with 50 mL of phosphorus oxychloride. After the initial vigorous reaction has subsided, the stirred mixture was heated at reflux for 30 minutes, and then cooled. Excess POCl$_3$ was distilled at reduced pressure, leaving a dark brown solid which was thoroughly extracted with dichloromethane. The extract was reduced and the residue was flash chromatographed (silica gel, CH$_2$Cl$_2$). Concentration of the eluate afforded a tan oil which gradually crystallized on standing. The product (1b), i.e. 1,3-bis(chloro-2,2-dicyano-vinyl)benzene, was distilled in a Kugelrohr apparatus at reduced pressure (~220° C./0.5 mm), then recrystallized from chloroform/hexanes, producing 2.78 g (29%) of slightly yellow crystals, m.p. 125°-127° C. An analytical sample was obtained after two further recrystallizations from chloroform/hexanes, m.p. 127°-129° C.

IR (KBr): 2235 cm$^{-1}$ (C≡N). MS (EI): 300 (M++2), 298 m/e (M+). $^1$H NMR (CDCl$_3$): δ7.80 (d t, 1H), 8.08 (d, J=1.6, 1H), 8.14 (m, 2H). $^{13}$C NMR (CDCl$_3$, APT): δ88.3 ↑ (=C(CN)$_2$), [110.7 ↑, 111.0 ↑] (C≡N), [129.3 ↓, 130.4 ↓ 133.5 ↓] (arom. CH), 133.7 ↑ (unprotonated arom. C), 164.6 (=C-Cl).

Anal. Calcd. for C$_{14}$H$_4$Cl$_2$N$_4$: C, 56.22; H, 1.35; N, 18.73.

Found: C, 56.01, H, 1.37; N, 18.67.

(1c)
Poly[oxy-1,4-phenyleneimino(dicyanovinylidene)-1,3phenylene-(dicyanovinylidene)imino-1,4-phenylene]

Dry nitrogen was passed through a 50 mL two-necked flask equipped with a gas inlet, reflux condenser, and magnetic stirrer, and the glassware was heated with a burner to expel surface moisture.

After the apparatus had cooled, the flask was charged with 0.8428 g (4.209 mmol) of 4,4'-diaminodiphenyl ether, 1.1001 g (9.005 mmol, 1.05 eq) of 4-(dimethylamino)pyridine as acid acceptor, and 10 mL of dry N-methyl pyrrolidone (NMP), and the resulting mixture was stirred. A solution of 1.2579 g (4.2053 mmol) of 1,3-bis(1-chloro-2,2-dicyano-vinyl)benzene (1b) in 10 mL of NMP was added quantitatively to the stirred amine solution at room temperature (23° C.). The mixture turned brown, and a precipitate appeared after a few minutes. The stirred mixture was heated under nitrogen for 18 hours at 70°±5° C. during which the solution turned green.

The reaction mixture was cooled to room temperature, and then poured into 150 mL of vigorously stirred water. A fine, green-yellow powder of the resulting polymer separated, and the mixture was stirred for 48 hours to agglomerate the precipitate.

The polymer solid was isolated by centrifugation, redissolved in N,N-dimethyl formamide (DMF), and reprecipitated into 300 mL of agitated methanol. The precipitate was isolated by centrifugation, washed with methanol, and dried in vacuo at 100° C. for 48 hours to produce 1.19 g (66%) of the polyenaminonitrile (1c), i.e. poly[oxy-1,4-phenyleneimino(dicyanovinylidene)-1,3-phenylene-(dicyanovinylidene)imino-1,4-phenylene], as a green powder.

The intrinsic viscosity of the polymer was 0.39 dL/g at 25° C. in DMF. Apparent $\overline{M}_n$=11,600 (mol. wt., number average); $\overline{M}_w$=34,400 (mol. wt., weight average) by gel permeation chromatography (GPC) in tetrahydrofuran (THF) (polystyrene standards).

Clear, yellow films of said polymer (1c) were cast from DMF.

IR (thin film): 3245 br (NH), 3080 w (arom. CH), 2218 s (C≡N), 1600, 1550 s br, 1438, 1398, 1228 s br, 1162 w, 1101 w, 1011 w, 837, 710 w cm$^{-1}$. $^1$H NMR ((CD$_3$)$_2$SO): δ6.6-8.2 (br m, 12H, arom. CH), 10.94 δ(br s, 2H, NH). $^{13}$C NMR ((CD$_3$)$_2$SO, APT): δ52.9 ↑ (=C(CN)$_2$), 118.7 ↓ (arom. CH ortho to oxygen), [127.4, 128.5 ↓; 132.1 ↓] (arom. CH), [132.7 ↑, 133.1 ↑] (unprotonated arom. C), 154.9 (C-O), 167.2 δ (vinyl C-N). The C≡N signals were barely visible above baseline noise as a broad, weak peak near 115 δ.

Anal. Calcd. for C$_{26}$H$_{14}$N$_6$O: C, 73.23; H, 3.31; N, 19.71.

Found: C, 71.32, H, 3.60; N, 19.91.

EXAMPLE 2

(3″)

(a) Preparation of 1,4-Bis(2,2-dicyano-1-hydroxy-vinyl)benzene, disodium salt (2a)

The two-phase reaction procedure of Example 1 (a) was repeated to condense 150.0 g (0.739 mol) of terephthaloyl chloride and 97.6 g (1.48 mol) of malononitrile in dichloromethane, in the presence of 16.6 g (0.0728 mol, 0.05 eq) of benzyltriethylammonium chloride in water, using 6N.NaOH solution. The product was recrystallized from methanol/water, to produce 98.4 g (43%) of the salt (2a) [bisenolate], i.e. 1,4-bis(2,2-dicyano-1-hydroxy-vinyl)benzene, disodium salt, as a yellow powder.

IR (KBr): 3450 br (possible hydrate), 2220 cm$^{-1}$ (C≡N).

(b) Preparation of 1,4-Bis(chloro-2,2-dicyano-vinyl)benzene (2b)

Using the same conditions as in Example 1 (b), the bisenolate (2a) (10.0 g, 32.7 mmol), i.e. 1,4-bis(2,2-dicyano-1-hydroxy-vinyl)benzene, disodium salt, was reacted with 50 mL of phosphorus oxychloride. In this case, the reaction product was distilled in a Kugelrohr apparatus at 190°–220° C./0.1 mm, to give 3.88 g (40%) of a tan product (2b), i.e. 1,4-bis(chloro-2,2-dicyano-vinyl)benzene, which was recrystallized twice from 1,2-dichloroethane/hexanes to obtain analytically pure material, m.p. 177°–179° C.

IR (KBr): 2225 cm$^{-1}$ (C≡N). MS (EI): 300 (M+ +2), 298 m/e (M+). $^1$H NMR (CDCl$_3$): δ8.00 (s). $^{13}$C NMR (CDCl$_3$): δ88.6 ↑ (=C(CN)$_2$), [110.7 ↑, 110.9 ↑] (C≡N), 129.6 (arom. CH), 137.0 ↑ (unprotonated arom. C), 164.4 (=C-Cl).

Anal. Calcd. for C$_{14}$H$_4$Cl$_2$N$_4$: C, 56.22; H, 1.35; N, 18.73.

Found: C, 56.00, H, 1.42; N, 18.91.

(2c) Poly[oxy-1,4-phenyleneimino(-dicyanovinylidene)-1,4phenylene-(dicyanovinylidene)imino-1,4-phenylene]

Using the same conditions as in Example 1 (c), 1.0491 g (5.2392 mmol) of 4,4'-diaminodiphenyl ether, 1.2804 g (10.480 mmol, 1.00 eq) of 4-(dimethylamino)pyridine as acid acceptor, and 1.5660 g (5.2354 mmol) of 1,4-bis(1-chloro-2,2-dicyanovinyl)benzene (2b) were reacted in dry N-methyl pyrrolidone (NMP), in this case with the stirred mixture being heated under nitrogen for 19 hours at 70°±5° C.

The reaction mixture was then cooled to room temperature, and poured into 150 mL of vigorously stirred water in a blender. The green solid which separated was filtered, redissolved in N,N-dimethyl formamide (DMF), and reprecipitated into 500 mL of methanol agitated in a blender. The resulting precipitate was collected, and the reprecipitation was repeated. The product was filtered, washed with methanol, and dried in vacuo at 100° C. for 48 hours to produce 1.40 g (63%) of the polyenaminonitrile (2c), i.e. poly[oxy-1,4-phenyleneimino(dicyanovinylidene)-1,4-phenylene-(dicyanovinylidene)imino-1,4-phenylene], as a yellow powder.

The intrinsic viscosity of the polymer was 0.84 dL/g at 25° C. in DMF. Apparent $\overline{M}_n$=6,600 (mol. wt., number average); $\overline{M}_w$=127,000 (mol. wt., weight average) by gel permeation chromatography (GPC) in tetrahydrofuran (THF) (polystyrene standards).

Tough, yellow films of said polymer (2c) were cast from DMF.

IR (thin film): 3242 br (NH), 3080 w (arom. CH), 2216 s (C≡N), 1598, 1560 s br, 1395 s, 1418, 1228 s br, 1167, 1099, 1011, 950 w, 877, 849, 838, 712 w, 662 w cm$^{-1}$. $^1$H NMR ((CD$_3$)$_2$SO): δ6.9–8.1 (br m, 12H, arom. CH), 10.95 δ (br s, 2H, NH). $^{13}$C NMR ((CD$_3$)$_2$SO, APT): δ52.2 ↑ (=C(CN)$_2$), [114.3, 116.9] (C≡N), 118.8 (arom. CH ortho to oxygen), [127.7, 129.7] (arom. CH), [133.0, 135.5] (unprotonated arom. C), 155.3 (C-O), 167.4 δ (vinyl C-N).

Anal. Calcd. for C$_{26}$H$_{14}$N$_6$O: C, 73.23; H, 3.31; N, 19.71.

Found: C, 71.36, H, 3.53; N, 20.02.

EXAMPLE 3

(3‴)

(a) Preparation of 4,4'-Bis(2,2-dicyano-1-hydroxy-vinyl)diphenyl sulfone, disodium salt (3a)

The two-phase reaction procedure of Example 1 (a) was repeated to condense 31.8 g (92.7 mmol) of sulfonyl-bisbenzoyl chloride and 12.9 g (195 mmol) of malononitrile in dichloromethane, in the presence of 6.1 g (18.5 mmol, 0.1 eq) of tetrabutylammonium bromide in water, using 6N NaOH solution. The product was extracted in a Soxhlet apparatus for 24 hours with dichloromethane, then dried in a vacuum oven at 100° C., leaving 40.4 g (98%) of the salt (3a) [bisenolate], i.e.

4,4'-bis(2,2-dicyano-1-hydroxy-vinyl)diphenyl sulfone, disodium salt, as a tan powder.

IR (KBr): 3450 br (possible hydrate), 2204 cm$^{-1}$ (C≡N).

(b) Preparation of 4,4'-Bis(chloro-2,2-dicyano-vinyl)diphenyl sulphone (3b)

A suspension of the bisenolate (3a) (10.0 g, 22.4 mmol), i.e. 4,4'-bis(2,2-dicyano-1-hydroxy-vinyl)diphenyl sulfone, disodium salt, 50 mL of phosphorus oxychloride, and 75 mL of 1,2-dichloroethane was refluxed with stirring for 18 hours. Solvent and excess POCl$_3$ were distilled at reduced pressure, leaving a brown solid. The solid was thoroughly extracted with boiling dichloromethane. The extract was concentrated and the residue was flash chromatographed (silica gel, CH$_2$Cl$_2$). The eluate was evaporated at reduced pressure to leave 6.81 g (69%) of a yellow oil which quickly crystallized. Recrystallization from 1,2-dichloroethane produced 5.4 g (55%) of product (3b), i.e. 4,4'-bis(chloro-2,2-dicyano-vinyl)diphenyl sulfone, as a yellow solid, m.p. 196°–198° C. An analytical sample was obtained after repeated recrystallization from 1,2-dichloroethane.

IR (KBr): 2195 cm$^{-1}$ (C≡N). MS (CI): 441 (M$^+$+2), 439 m/e (M$^+$). $^1$H NMR (CDCl$_3$): δ [8.12 (d, 4H, J=8.5), 7.97 (d, J=8.5, 4H)] arom. CH. $^{13}$C NMR (CDCl$_3$): δ88.8 ↑ (=C(CN)$_2$), [110.6, 110.8] (C≡N), [128.8, 130.1] (arom. C̄H), 137.2 (arom. C̲-C-Cl), 145.0 (arom. C̲-SO$_2$), 164.7 (=C-Cl).

Anal. Calcd. for C$_{20}$H$_8$Cl$_2$N$_4$O$_2$S: C, 54.69; H, 1.84; Cl, 16.14; N, 12.75; S, 7.35. Found: C, 54.38, H, 2.13; Cl, 16.17; N, 12.61; S, 7.35.

(3c) Poly[sulfonyl-1,4-phenylene(dicyanovinylidene)imino-1,4-phenyleneoxy-1,4-phenyleneimino(-dicyanovinylidene)-1,4-phenylene]

Using the same conditions as in Example 1 (c), 2.4911 g (12.441 mmol) of 4,4'-diaminodiphenyl ether, 3.0509 g (24.975 mmol, 2.00 eq) of 4-(dimethylamino)pyridine as acid acceptor, and 6.464 g (12.43 mmol) of 4,4'-bis(1-chloro-2,2-dicyanovinyl)diphenyl sulfone (3b) were reacted in 30 mL of dry N-methyl pyrrolidone (NMP), in this case with the stirred mixture being heated under nitrogen for 20 hours at 75°±5° C.

The reaction mixture was then cooled to room temperature, and poured into 250 mL of vigorously agitated water in a blender. A yellow solid formed, which was collected by filtration, and washed thoroughly with water. The solid was redissolved in N,N-dimethyl formamide (DMF), and reprecipitated into 250 mL of vigorously stirred methanol. A fine, yellow powder formed, which was isolated by centrifugation. The reprecipitation from DMF into methanol was repeated, and the product was again isolated by centrifugation. After drying in vacuo at 140° C. for 24 hours, 6.68 g (95%) were obtained of the polyenaminonitrile (3c), i.e. poly[-sulfonyl-1,4-phenylene(dicyanovinylidene)imino-1,4-phenyleneoxy-1,4-phenyleneimino(dicyanovinylidene)-1,4-phenylene], as a green-yellow powder.

The intrinsic viscosity of the polymer was 0.68 dL/g, measured in DMF at 25° C. Apparent $\overline{M}_n$=3,370 (mol. wt., number average); $\overline{M}_w$=12,600 (mol. wt., weight average) by gel permeation chromatography (GPC) in tetrahydrofuran (THF) (polystyrene standards).

Tough, yellow films of said polymer (3c) were cast from DMF.

IR (thin film): 3455 br (NH), 3060 w (arom. CH), 2213 s (C≡N), 1593, 1540 s br, 1412, 1393, 1322, 1283, 1238 br, 1160, 1099, 1011, 950 w br, 840, 743, 655, 628, 610 cm$^{-1}$. $^1$H NMR ((CD$_3$)$_2$SO): δ6.7–8.2 (br m, 16H, arom. CH), 10.95δ (br s, 2H, NH). $^{13}$C NMR ((CD$_3$)$_2$SO, APT): δ52.2 ↑ (=C(CN)$_2$), [113.9 ↑, 117.1 ↑] (C≡N), 118.9 ↓ (arom. C̄H ortho to oxygen), [128.0 ↓, 132.0 ↓] (arom. CH), [132.7 ↑, 138.1 ↑] (unprotonated arom. C), 143.0 ↑ (C-SO$_2$), 155.7 ↑ (C-O), 166.7δ (vinyl C-N).

Anal. Calcd. for C$_{32}$H$_{18}$N$_6$O$_3$S: C, 67.84; H, 3.20; N, 14.83; S, 5.66. Found: C, 66.17, H, 3.37; N, 14.38; S, 5.68.

For purposes of comparison, the cyclization of enaminonitrile by flash thermolysis per equation (5) is exemplified as follows:

EXAMPLE 4

Preparation of 4-Amino-2-phenyl-quinoline

A solution of an isomer (cis, trans) mixture of E,Z-3-phenyl-3-(phenylamino)-2-propenenitrile was dissolved in 50 mL of toluene, and placed in a dropping funnel above a vertically mounted quartz tube packed with bits of broken quartz. A two-necked receiving flask cooled to −78° C. was attached to the bottom of the tube, the tube was heated to 650° C., and pressure in the system was reduced to 20 torr. The solution was dripped slowly into the hot tube, and the product was collected in the receiver. Residual E,Z-3-phenyl-3-(phenylamino)-2-propenenitrile was washed into the reaction tube with chlorobenzene.

The contents of the receiver were warmed to room temperature, and the solvent was removed in a stream of dry nitrogen. A yellow oil formed, which was crystallized from boiling toluene to give 0.151 g (30%) of 4-amino-2-phenyl-quinoline as tan crystals, m.p. 162°–164° C. (lit. 164° C.).

IR (KBr): [3470, 3310] (NH), 3060 (arom. CH), 1645, 1582, 1549, 1514, 1495, 1450, 1437, 1410, 1367, 1340, 1283, 1234, 1125, 1072, 923, 850, 839, 774, 758, 700, 673 cm$^{-1}$. MS (DIP/EI): 220 (M$^+$, 100), 219 (M$^+$—H, 82), 204 (M$^+$—NH$_2$, 12). $^1$H NMR (CDCl$_3$): 4.79 (br s, 2H, NH$_2$), 7.0–8.2δ (m, 10H, arom. CH). $^{13}$C NMR (CDCl$_3$): 101.6, 118.1, 119.9, 124.6, 127.5, 128.6, 128.9, 129.5, 130.4, 140.5, 149.2, 150.0, 158.1δ.

Notes:
1. Selected $^{13}$C spectra were obtained using the "Attached Proton Test" (APT), by which technique the signals for carbon atoms bearing an even number of protons appear normal (denoted by ↑ after the observed shift), whereas the signals for carbon atoms bearing an odd number of protons are inverted (denoted by ↓ after the observed shift).
2. Mass spectra (MS) were obtained by Direct Insertion Probe (DIP), with ionization being done by 70 eV electron impact (EI) or methane chemical ionization (CI).

The above polyenaminonitriles (1c), (2c) and (3c) according to the present invention possess moderately high molecular weights, as shown by the measurements of intrinsic viscosity (in DMF at 25.0° C.) and gel permeation chromatography apparent molecular weight (in THF at 22° C., using polystyrene standards), set forth in Table 1.

TABLE 1

| Polymer | [η] dL./g | $\overline{M}_n$ | $\overline{M}_w$ | $\overline{M}_w/\overline{M}_n$ |
|---|---|---|---|---|
| (1c) | 0.39 | 11,600 | 34,400 | 2.96 |
| (2c) | 0.84 | 6,160 | 127,000 | 20.5 |
| (3c) | 0.68 | 3,370 | 12,600 | 3.76 |

In a typical case, for films of the polyenaminonitrile which had been cast from DMF, dielectric measurements of the polyenaminonitrile, before heat-curing, and of the resulting poly(aminoquinoline), after heat-curing at 400° C. for 4 hours under nitrogen, are shown in Table 2.

TABLE 2

| Test Freq. (Hz) | Capacitance (pf) | e | Dissipation Factor |
|---|---|---|---|
| Before heat-curing$^a$ | | | |
| 10$^1$ | 474.5 | 8.452 | 0.0437 |
| 10$^3$ | 456.9 | 8.146 | 0.0106 |
| 10$^4$ | 448.5 | 7.996 | 0.0089 |
| 10$^5$ | 446.9 | 7.968 | 0.0145 |
| After heat-curing$^b$ | | | |
| 10$^3$ | 696.9 | 5.178 | 0.0042 |
| 10$^4$ | 689.9 | 5.126 | 0.0095 |
| 10$^5$ | 676.6 | 5.027 | 0.0368 |
| 10$^6$ | 658.7 | 4.894 | 0.2509 |

$^a$Sample thickness 20.0 μm; electrode area 1.27 cm$^2$; 24.0° C.
$^b$Sample thickness 7.5 μm; electrode area 1.14 cm$^2$; 24.9° C.
Dielectric constant e=(cap. in picofarads, pf) (thickness in μm)/(area in cm$^2$) (885.4).

In review, spectroscopic data for the three polymers (1c), (2c) and (3c) closely matched data from model compounds which contained the same structural units.

As to properties, polymers (1c), (2c) and (3c), which are of moderately high molecular weight (Table 1), can be cast from DMF into tough (fingernail-creasable), transparent, yellow films.

On thermogravimetric analysis, these three polymers exhibited excellent thermal stability, losing no mass below 400° C. in nitrogen and in air, although they decomposed completely in air above 500° C., while retaining ~70% of their original mass in nitrogen at 900° C.; typical TGA results being shown in FIG. 1.

Isothermal aging studies, performed under nitrogen at 400° C. and 500° C., of samples of these three polyenaminonitriles, show a very slow mass loss, due to thermal decomposition, over 12 hours after the volatilization initially of oligomers from the sample. However, isothermal aging of polymer (2c), in particular, in air at 300° C. for 60 hours caused the loss of 55% of the original mass of the sample.

Samples of polymer (2c) were also tested for water absorption, after being dried to constant weight at 110° C. under nitrogen in the TGA apparatus and then cooled to 40° C., by exposure to air saturated with water vapor. A solution cast film of (uncured) polymer (2c) absorbed approximately 4% of its weight in water; a powder sample of polymer (2c), isolated by reprecipitation into methanol after synthesis, absorbed only 0.6% additional mass; and a sample of polymer (2c) film, which had been cured for 2 hours at 300° C. to convert the polyenaminonitrile to the corresponding poly(aminoquinoline), as noted below, absorbed 10.4% of its weight in water.

The dielectric constant of a film of the polyenaminonitrile (2c) was found to be near 8 (Table 2), an unusually large value and indicative of the large degree of charge separation within the enaminonitrile groups in the polymer, also observed in $^{13}$C NMR spectra of the polymers and model compounds. This very large dielectric constant points to the fact that a large degree of interaction of the molecular dipoles is present in the uncured polymer film. After heat treatment at 400° C., the dielectric constant fell to approximately 5, which points to the fact that some of the molecular dipoles are consumed in the cyclization process to the corresponding poly(aminoquinoline).

Glass transition temperatures were not detected by differential scanning calorimetry for these polymers (1c), (2c) and (3c); film and powder samples of the polymer (2c) gave identical DSC results. However, very broad glass transitions were observed for these polymers between 200°-250° C. by optical microscopy.

As to cyclization, for forming the corresponding poly(aminoquinolines), differential scanning calorimetry analysis detected a broad, prominent exothermic transition for all three polyenaminonitriles (1c), (2c) and (3c), starting at 300° C. and reaching maximum intensity near 350° C., confirming cyclization to the corresponding poly(aminoquinolines), since this peak was completely absent when the samples were cooled and rescanned, typical results being shown in FIG. 2.

Samples (films) of these cyclizable enaminonitrile polymers heated above 300° C. (and thereby "cured" to the corresponding poly(aminoquinoline) material), changed color from yellow to orange, became slightly brittle, and were completely insoluble in solvents for the untreated polymer. However, the cured polymer films of poly(aminoquinoline) retained some flexibility.

In addition, all three uncured polymers displayed a gradual change in their IR spectra as they were heated at 400° C. under nitrogen over a period of about 4 hours during which the polymers became cyclized and cured. The enamine N-H stretching band at 3260 cm$^{-1}$ disappeared, and was replaced by two new bands at 3365 and 3480 cm$^{-1}$. At the same time, the nitrile (—C≡N) band near 2210 cm$^{-1}$ decreased to approximately half its original intensity. The IR spectrum of 4-amino-2-phenyl-3-quinoline-carbonitrile (a model compound synthesized for comparison and analogous to the compound obtained per equation (5) above) showed the same bands for the cured polymer of the present invention.

The above data evidence the rearrangement per equation (3) above of the cyclizable enaminonitrile repeat unit into a corresponding 4-amino-quinoline repeat unit polymer according to the invention.

It is considered that the insolubility of the cyclized polymers herein is caused by the significant stiffness of the rearranged (cyclized) chain, or by curing, i.e. crosslinking, e.g. in which an amino group formed in the rearrangement subsequently attacks a neighboring cyano group, as earlier noted. However, such crosslinking or curing cannot alone be the major "curing" processes, because they would lead to imino derivatives, which would only exhibit one N-H band in the IR spectra, whereas two bands were actually observed for the instant polymers, consistent with a primary amine function generated by the cyclization reaction, plus diminished intensity enamine and cyano bands.

To demonstrate that cyclizing of the polyenaminonitriles to poly(aminoquinolines) can occur without crosslinking (curing) and consequent loss of solubility, a sample of the polyenaminonitrile (3c) was dissolved in molten diphenylsulfone (1.7% w/w) and heated in this dilute solution form to 340° C. for 30 minutes in a sealed tube under vacuum. Diphenylsulfone was removed by washing the reaction mixture thoroughly with acetone, in which the thereby cyclized polymer was insoluble. The IR spectrum of the polymer "cured" in this way exhibited the primary amine two N-H band and diminished intensity enamine and cyano band features discussed above, evidencing cyclization to the rearranged poly(aminoquinoline) structure.

Specifically, bands were present at 3360 and 3450 cm$^{-1}$ (primary amine), and the enamine and cyano bands had diminished in intensity compared with the spectrum of the starting material. More important, this material was completely soluble in dimethylsulfoxide (DMSO), and its $^1$H NMR spectrum showed no trace of the enamine NH absorption near 11.0$\delta$. Instead, a complicated multiplet between 7.5 and 8.4$\delta$ was present. Clearly, this enaminonitrile polymer can be "cured", i.e. cyclized to poly(aminoquinoline) without crosslinking, by heating in dilute solution instead of in solid mass form.

Although the reasons for the obtained results are not completely understood, the formation of the amino group may be the cause of the low thermal stability at 300° C. in air of polymer (2c) per said 60 hour isothermal aging study (compared to conventional polyimide, which lacks the easily oxidized NH group). Also, the hydrogen bonding ability of the amino group may cause the absorption of a large amount of water (10.4%) by the cured polymer (2c) after two hours at 300° C., as pointed out above.

On the other hand, the hydrolytic stability of the polyenaminonitriles prepared according to this invention is far superior to that of the polyamic acid precursors to polyimides. The stability of the enaminonitrile linkage was clearly demonstrated by an experiment with the model compound VII, obtained per equation (4), i.e. [(4-methoxyphenylamino)-phenylmethylene]-propanedinitrile, which did not show any decomposition, by high pressure liquid chromatography (HPLC), after boiling the compound in 50% aqueous acetonitrile for 6 days. As a further demonstration, polyenaminonitrile films according to this invention can be boiled in water, as earlier noted, or soaked in 15% aqueous HCl without a significant loss of strength.

While specific embodiments of the invention have been shown and described in detail to illustrate the application of the principles of the invention, it will be understood that the invention may be embodied otherwise without departing from such principles.

What is claimed is:

1. Process for making thermally stable polyenaminonitrile comprising polymerizing a di(cyanovinyl) monomer with an organic diamine to yield polyenaminonitrile wherein said polyenaminonitrile is a polymer which is thermally and hydrolytically stable and has a backbone comprising recurring enaminonitrile units which include a carbon-carbon double bond moiety in which a nitrogen atom bearing a hydrogen atom is directly attached to one carbon atom of the carbon to carbon double bond moiety and at least one nitrile group is directly attached to the other carbon atom of the carbon-carbon double bond moiety.

2. Process of claim 1 wherein said monomer and diamine are used in a mole ratio of about 1:1 in the presence of an acid acceptor.

3. Process of claim 1 for making polyenaminonitrile comprising polymerizing an di(canovinyl) monomer having the formula with a diamine having the formula NH$_2$-B-NH$_2$ to form the corresponding polyenaminonitrile having a backbone comprising recurring units of the formula wherein
Y is any leaving group,
X is hydrogen or any electron-withdrawing group,
A is a mononuclear or polynuclear unsaturated ring system,
B is a mononuclear or polynuclear unsaturated ring system, an aliphatic group, a cycloaliphatic group, or an aliphaticcycloaliphatic group, and
a is 0 or 1.

4. Process of claim 3 wherein B is a mononuclear or polynuclear unsaturated ring system.

5. Process of claim 4 wherein each enaminonitrile group linked to B is linked via its enamino group to a nuclear atom of a corresponding unsaturated 6-membered ring structure comprised by B and having a hydrogen atom at an ortho position to said nuclear atom.

6. Process of claim 3 wherein the di(canovinyl) monomer comprises a difunctional $\beta$-halo dicyanovinyl monomer.

7. Process of claim 6 including reacting a diacid chloride with malononitrile under phase transfer catalyzed basic conditions to form disodium bisenolate, and reacting the bisenolate with phosphorus oxychloride to form the monomer.

8. Process for making poly(aminoquinoline) comprising heating cyclizable polyenaminonitrile sufficiently to effect a molecular rearrangement reaction to yield poly(aminoquinoline) wherein said polyenaminonitrile is a polymer which is thermally and hydrolytically stable and has a backbone comprising recurring enaminonitrile units which include a carbon-carbon double bond moiety in which a nitrogen atom bearing a hydrogen atom is directly attached to one carbon atom of the carbon to carbon double bond moiety and at least one nitrile group is directly attached to the other carbon atom of the carbon-carbon double bond moiety.

9. Process of claim 8 wherein the heating is effected to at least about 350° C.

10. Process of claim 8 wherein the polyenaminonitrile has a backbone comprising recurring units of the formula wherein

X is hydrogen or any electron-withdrawing group,

A and B are each individually a mononuclear or polynuclear unsaturated ring system, and a is 0 to 1, each enaminonitrile group linked to B being linked via its enamino group to a nuclear atom of a corresponding unsaturated 6-membered ring structure comprised by B and having a hydrogen atom at an ortho position to said nuclear atom, such that the poly(aminoquinoline) has a corresponding backbone comprising units of the formula wherein X, A, B and a are the same as defined above.

11. Process of claim 8 for making poly(aminoquinoline) comprising heating polyenaminonitrile having the formula wherein Y is any leaving group, X is hydrogen or any electron-withdrawing group,

A and B are each individually a mononuclear or polynuclear unsaturated ring system, a is 0 to 1, and n is at least 2, each enaminonitrile group linked to B being linked via its enamino group to a nuclear atom of a corresponding unsaturated 6-membered ring structure comprised by B and having a hydrogen atom at an ortho position to said nuclear atom, sufficiently to effect a molecular rearrangement reaction to yield poly(aminoquinoline) having the formula wherein Y, X, A, B, a and n are the same as defined above.

12. Process of claim 8 wherein the polyenaminonitrile is in the form of a shaped solid mass essentially free from volatiles and the reaction is effected in the absence of any solvent and without the evolution of volatiles to produce the poly(aminoquinoline) in situ in the form of a corresponding shaped solid mass which is essentially free from volatiles-generated bubble and pin hole imperfections.

13. Process of claim 12 wherein the shaped solid mass is thereafter cured.

14. Process of claim 12 wherein the starting shaped solid mass is in the form of a continuous material integral mass.

15. Process of claim 12 wherein the starting shaped solid mass is in the form of a composite material particle mass and the reaction is effected while subjecting the mass to compacting mechanical consolidating pressure sufficient to coalesce the particles into a continuous material integral mass during the reaction.

16. Poly(aminoquinoline) in the form of a shaped solid mass essentially free from volatiles-generated bubble and pin hole imperfections, and produced in situ by heating cyclizable polyenaminonitrile in the form of a corresponding shaped solid mass essentially free from volatiles and in the absence of any solvent to at least about 350° C. to effect a molecular rearrangement reaction without the evolution of volatiles wherein said polyenaminonitrile is a polymer which is thermally and hydrolytically stable and has a backbone comprising recurring enaminonitrile units which include a carbon-carbon double bond moiety in which a nitrogen atom bearing a hydrogen atom is directly attached to one carbon atom of the carbon to carbon double bond moiety and at least one nitrile group is directly attached to the other carbon atom of the carbon-carbon double bond moiety.

17. Poly(aminoquinoline) of claim 16 wherein the shaped solid mass has been cured in situ after the reaction.

18. Poly(aminoquinoline) of claim 17 wherein the shaped solid mass is in the form of a thin film.

19. Cured poly(aminoquinoline) made in situ from polyenaminonitrile in the form of a shaped solid mass in the absence of any solvent and without the evolution of volatiles, and which is essentially free from volatiles-generated bubble and pin hole imperfections wherein said polyenaminonitrile is a polymer which is thermally and hydrolytically stable and has a backbone comprising recurring enaminonitrile units which include a carbon-carbon double bond moiety in which a nitrogen atom bearing a hydrogen atom is directly attached to one carbon atom of the carbon to carbon double bond moiety and at least one nitrile group is directly attached to the other carbon atom of the carbon-carbon double bond moiety.

20. Cured polymer product produced by curing a thermally stable polyenaminonitrile wherein said polyenaminonitrile is a polymer which is thermally and hydrolytically stable and has a backbone comprising recurring enaminonitrile units which include a carbon-carbon double bond moiety in which a nitrogen atom bearing a hydrogen atom is directly attached to one carbon atom of the carbon to carbon double bond moiety and at least one nitrile group is directly attached to the other carbon atom of the carbon-carbon double bond moiety.

21. Product of claim 20 in the form of a crosslinked polymer.

22. Product of claim 20 in the form of an essentially void-free polymer structure.

23. Product of claim 20 formed from cyclizable polyenaminonitrile.

24. Product of claim 20 formed from non-cyclizable polyenaminonitrile.

25. Process comprising curing uncured thermally stable polyenaminonitrile to cured form wherein said polyenaminonitrile is a polymer which is thermally and hydrolytically stable and has a backbone comprising recurring enaminonitrile units which include a carbon-carbon double bond moiety in which a nitrogen atom bearing a hydrogen atom is directly attached to one carbon atom of the carbon to carbon double bond moiety and at least one nitrile group is directly attached to the other carbon atom of the carbon-carbon double bond moiety.

* * * * *

UNITED STATES PATENT AND TRADEMARK OFFICE
CERTIFICATE OF CORRECTION

PATENT NO. : 5,053,478

DATED : October 1, 1991

INVENTOR(S) : Moore et al.

It is certified that error appears in the above-identified patent and that said Letters Patent is hereby corrected as shown below:

```
On the title page, Item [54]
  Please change the title of the invention from:

PRODUCTION AND PROCESSING OF THERMALLY STABLE POLYENAMINONITRILES to:

PRODUCTION AND PROCESSING OF THERMALLY STABLE POLYENAMINONITRILES AND

POLYAMINOQUINOLINES THEREFROM
```

Signed and Sealed this

First Day of March, 1994

Attest:

BRUCE LEHMAN

Attesting Officer     *Commissioner of Patents and Trademarks*